(12) United States Patent
Rising, III

(10) Patent No.: US 7,284,188 B2
(45) Date of Patent: Oct. 16, 2007

(54) METHOD AND SYSTEM FOR EMBEDDING MPEG-7 HEADER DATA TO IMPROVE DIGITAL CONTENT QUERIES

(75) Inventor: Hawley K. Rising, III, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 439 days.

(21) Appl. No.: 10/112,614

(22) Filed: Mar. 29, 2002

(65) Prior Publication Data

US 2004/0205510 A1  Oct. 14, 2004

(51) Int. Cl.
*G06F 17/00* (2006.01)

(52) U.S. Cl. .................... 715/501.1; 715/513

(58) Field of Classification Search ............ 715/501.1, 715/513; 707/3
See application file for complete search history.

(56) References Cited

U.S. PATENT DOCUMENTS

| | | | | |
|---|---|---|---|---|
| 6,564,263 | B1 * | 5/2003 | Bergman et al. | 709/231 |
| 6,748,382 | B1 * | 6/2004 | Mohan et al. | 707/10 |
| 6,961,446 | B2 * | 11/2005 | Imagawa et al. | 382/103 |
| 2001/0047517 | A1 * | 11/2001 | Christopoulos et al. | 725/87 |
| 2002/0184195 | A1 * | 12/2002 | Qian | 707/3 |
| 2003/0032033 | A1 * | 2/2003 | Anglin et al. | 435/6 |

OTHER PUBLICATIONS

Rehm, Eric, "Representing Internet Streaming Media Metadata Using MPEG-7 Multimedia Description Schemes", Proceedings of the 2000 ACM Workshops on Multimedia, Nov. 2000, pp. 93-98.*
Dimitrova, Nevenka, et al, "Video Scouting Demonstration: Smart Content Selection and Recording", Proceedings of the Eighth ACM International Conference on Multimedia, Oct. 2000, pp. 499-500.*
Nack, Frank, et al, "Everything You Wanted to Know About MPEG-7: Part 2", IEEE, 1999, pp. 64-73.*
Hu, Michael J., et al, "Mutimedia Description Framework (MDF) for Content Description of Audio/Video Documents", Proceedings of the Fourth ACM Conference on Digital Libraries, Aug. 1999, pp. 67-75.*

(Continued)

*Primary Examiner*—William Bashore
*Assistant Examiner*—Laurie Ries
(74) *Attorney, Agent, or Firm*—John P. O'Banion

(57) ABSTRACT

A system and method for augmenting digital material with MPEG-7 content descriptions to enhance searching and selection of the digital material. Pursuant to the collection of content information about the digital material, either through receipt or content characterization, a set of MPEG-7 descriptor schemes and descriptors are created for constituent elements of the content. The MPEG-7 descriptions are structured as META tags, including predetermined opening and closing delimiters, which are inserted within the header field of the digital material. The MPEG-7 content description data may contain multiple content levels describing levels of associated embedded content.

27 Claims, 3 Drawing Sheets

OTHER PUBLICATIONS

Zaiane, Osmar R., et al, "Mining MultiMedia Data", Proceedings of the 1998 Conference of the Centre for Advanced Studies on Collaborative Research, Nov. 1998, pp. 1-18.*

Alatan, A. Aydin, "Summary of ISO MPEG-7 Standardization Activities and Related Research in NJCMR", NSF Industry/University Co-Operative Research Center for Next Generation Video, Jan. 11, 2000.*

Ludascher, Bertram, et al, "Preservation of Digital Data with Self-Validating, Self-Instantiating Knowledge-Based Archives", SIGMOD Record, vol. 30, No. 3, Sep. 2001, pp. 54-63.*

Ponceleon, Dulce, et al, "Key to Effective Video Retrieval: Effective Cataloging andf Browsing", Proceeidngs of the Sixth ACM International Conference on Multimedia, Sep. 1998, pp. 99-107.*

* cited by examiner

```
<HTML>
<HEAD>
<META NAME="MPEG7Unit" CONTENT=" <MPEG7Unit>
      MPEG-7 description here
      </MPEG7Unit> >
<META NAME="Robot" CONTENT="all">
</HEAD>
<BODY>
...web page...
</BODY>
</HTML>
```

FIG. 3 ns within digital content-laden material, and more particularly to embedding MPEG-7 content descriptions as META data within the header of a document containing markup language to increase specificity of content selection.

METHOD AND SYSTEM FOR EMBEDDING MPEG-7 HEADER DATA TO IMPROVE DIGITAL CONTENT QUERIES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

The present invention pertains to content selection mechanisms within digital content-laden material, and more particularly to embedding MPEG-7 content descriptions as META data within the header of a document containing markup language to increase specificity of content selection.

2. Description of the Background Art

The proliferation of digital material, such as over the Internet, has provided persons utilizing such content with nearly an unlimited amount of text and multimedia from which to choose. Attached, however, to the advantages of this content proliferation are the practical difficulties associated with searching, or otherwise selecting, digital content elements to best meet the content needs of the searcher. The large amount of digital material, such as various forms of multimedia content, that can be returned from a content search often require inordinate amounts of human interaction to select the most appropriate items in relation to the desired content. Large content repositories, such as those providing stock photographs over the Internet, have utilized diverse methods of cataloging their content to speed the selection process.

The Moving Pictures Expert Group, known as the MPEG working group of ISO/IEC, has proposed a standard referred to as MPEG-7 for describing content, with particular emphasis on multimedia content such as video, images, music, speech, audio, and so forth. It should be appreciated that MPEG-7 provides a standard for representing information about the content, and does not provide a mechanism for representing actual content, as were found in the previous standards, such as MPEG-1 and MPEG-2.

Included within the content descriptions within MPEG-7 are the use of descriptors that can be utilized to describe the various features of the multimedia content, and the use of description schemes which provide predefined structures of descriptors and their relationships. The standard provides for differing levels of granularity and user-group specificity within content descriptions. For example, the description of an image content element may describe the shape, size, and color, while a higher level of abstraction may for instance describe mood, genre, semantics and relationships which exist within associated content. Machine generated information, such as color histograms and audio characterization data may also be included within the MPEG-7 descriptions. Each description may also contain content type descriptions including: form, such as data size and coding scheme; classification, such as parental ratings and usage area; access conditions, such as copyright information, price, and contact information; context, such as from where the content was collected or created; links to other relevant content, and so forth. It will be appreciated that various levels of content information may be contained by the MPEG-7 standard for indexing or cataloging multimedia content. However, users or agents searching for select content do not have a convenient method for utilizing MPEG-7 content descriptions to facilitate their searches.

Therefore, a need exists for a method and system of incorporating MPEG-7 content descriptions into accessible content, such as content available over the Internet, to facilitate rapid and accurate content selection. The present invention satisfies those needs, as well as others, and overcomes the deficiencies of previously developed systems.

BRIEF SUMMARY OF THE INVENTION

The present invention is capable of providing searchable MPEG-7 content descriptions in association with digital material, particularly those containing multimedia content. The system and method can be implemented within a variety of infrastructures, such as within network enabled computers communicating over the World Wide Web. Generally, the invention provides for the insertion of one or more content descriptions according to the MPEG-7 multimedia content description standard into an element of digital material to allow parameterized content-related searches.

The MPEG-7 content description is received, generated, or a combination thereof within a content description definition routine executing on a computer system. The content description may be received through an interface routine into the content description definition routine, generated by a characterization routine which determines the characteristics of content elements to be represented as MPEG-7 content, generated by a conversion routine adapted for converting content information from a format that is not compliant with MPEG-7 into a compliant MPEG-7 format, generated from user input collected within a human interface capable of collecting objective and subjective characterization data about the content in response to human interaction, and combinations thereof. The content description, therefore, may be created from information received about the digital material object, determined by translations of content information, determined by direct characterization, determined with human intervention, and so forth along with combinations thereof. By way of example, information may be received in formats other than MPEG-7 and translated into standard descriptor formats, or less preferably included into non-normative parts of a descriptor. Content may be characterized, such as by utilizing algorithms to create a histogram of colors which are found in a content element, whereupon the characterization information is subsequently formatted into an MPEG-7 content description. It will be appreciated that the digital material object may contain numerous individual content elements, for example as may be found within an HTML web page containing text, graphics, and audio elements. The generation of the content description may therefore include the characterization, or alternatively the receipt, of content information relating to the elements of content and preferably their respective interrelation, if applicable. The MPEG-7 description is then embedded within the digital material to thereby augment the content with the additional descriptive information provided under MPEG-7. The description is generally provided by way of descriptors and description schemes that are embedded within a META tag inserted into the header of the digital material object. The structure of the inserted content description containing, by way of example, a META tag, opening delimiter, one or more levels of content descriptions, and a closing delimiter.

An object of the invention is to provide a mechanism for embedding content descriptions within digital material objects having headers, such as those containing multimedia elements.

Another object of the invention is to provide a mechanism for embedding information that describes layers of content elements.

Another object of the invention is to provide a method of embedding content information that conforms to an accepted standard so that content from various providers, including geographically disbursed providers, may be equally considered during a search.

Another object of the invention is to provide a simple method of embedding content which is applicable to various documents written in a markup language that contain a header, such as SGML and subsets which include HTML, XML, and WAP.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a listing of an HTML header segment which exemplifies META tag use according an aspect of the present invention.

DETAILED DESCRIPTION OF THE INVENTION

Figure 1:
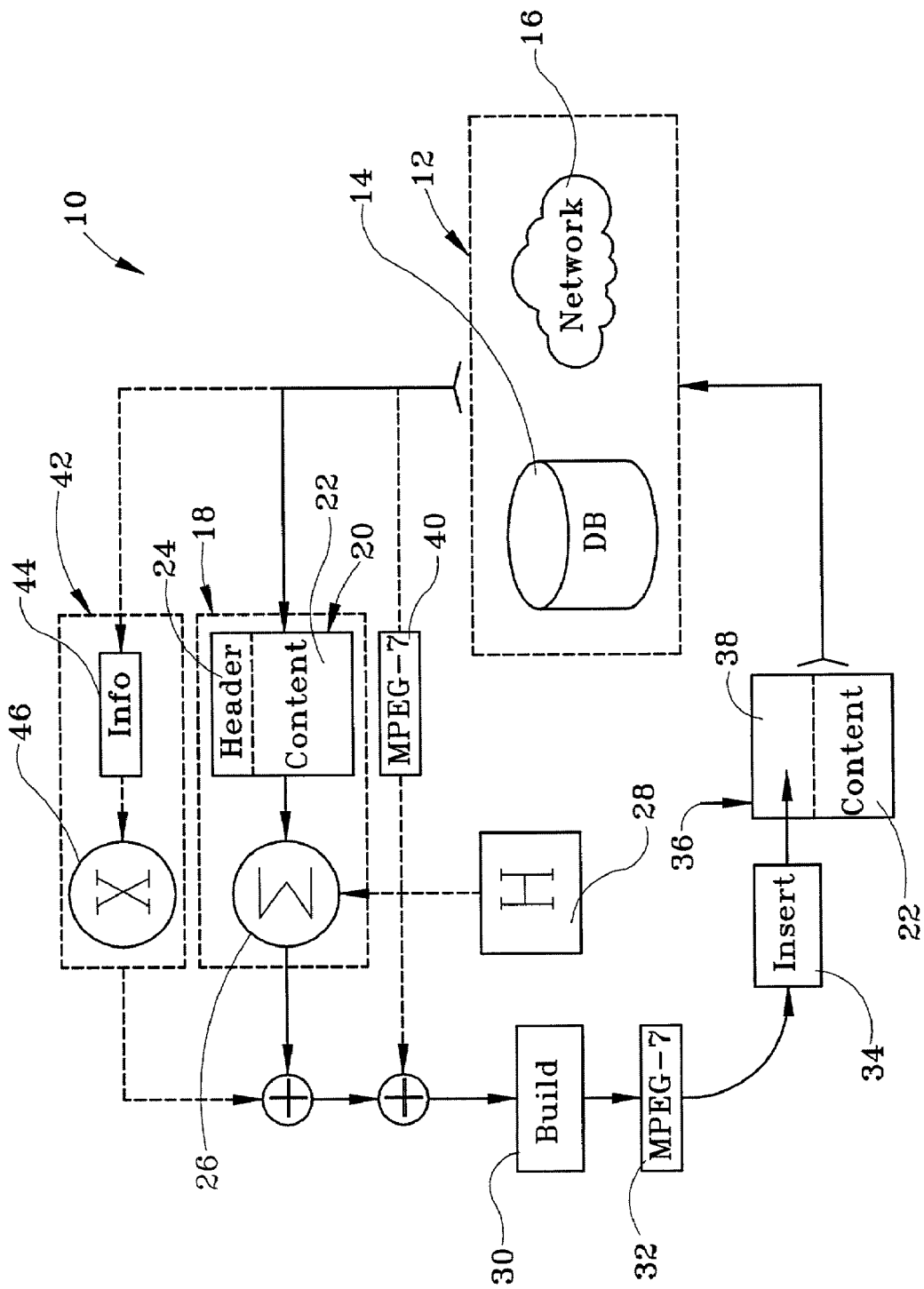
FIG. 1 is a schematic of a system for embedding MPEG-7 content descriptions within a digital material object according to the present invention, shown for use with content and information repositories comprising either local databases or network derived resources.
Figure 2:
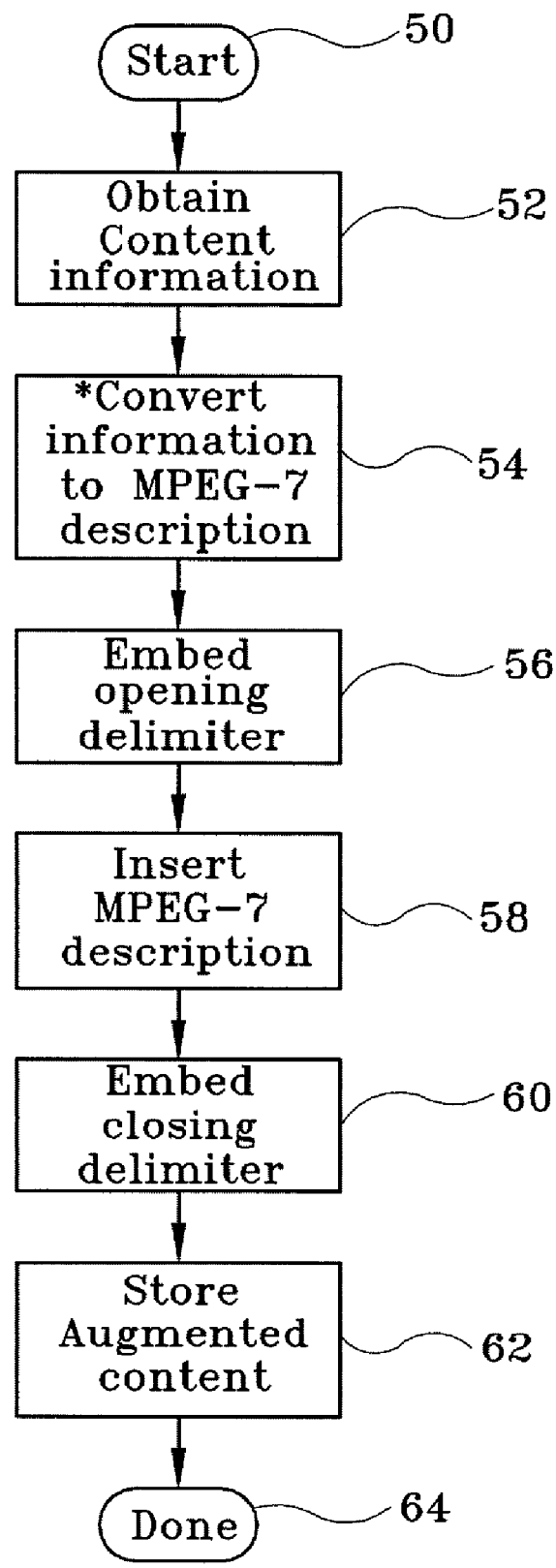
FIG. 2 is a flowchart of a process for embedding the content descriptions within a digital material object according to an embodiment of the present invention.

Referring more specifically to the drawings, for illustrative purposes the present invention is embodied in the systems and methods generally shown in FIG. 1 through FIG. 3. It will be appreciated that the systems may vary as to configuration and as to details of the elements, and that the methods may vary as to the specific steps and sequence, without departing from the basic concepts as disclosed herein.

FIG. 1 illustrates a system 10 according to the invention for embedding MPEG-7 content descriptions within the headers of digital material objects so that subsequent searches on the augmented content may be performed with more speed and accuracy. Content may be retrieved from a variety of source repositories 12, which include local and remote databases 14, along with network based resources 16 such as servers connected to the Internet. Information which characterizes the content may be provided by the same source repository 12, retrieved from a third party, or performed by a characterization routine 18. A digital material object 20 is shown comprising content 22 and a header 24 that may follow any of various markup language formats including SGML and subsets that include HTML, XML, WAP, and others. Digital material object 20 may be characterized within routine 18 that performs summarizing 26 of the content, for example the color based histograms, size, type, and other information as may be extracted from the content. Additional characterization data may be optionally derived from human intervention 28, wherein an operator can enter characterization data based on more subjective criteria about the content object, such as genre, theme, and classification. The characterization information is preferably generated directly into an MPEG-7 description for use by an embeddable description building routine 30 which creates an insertable META tag description 32 which is then inserted by an insertion routine 34 within the digital material object 20 to create a new digital material object 36 augmented with MPEG-7 content descriptions within the enlarged header 38, while maintaining identical content 22. It will be appreciated that information about digital material object 20 may be fully or partially obtained from a database 14 or via a network 16 for use within the system and may be obtained in a variety of formats. The information may additionally, or alternatively, be received in an MPEG-7 format 40 whereupon it may be utilized separately, or in combination with other information for use by the embeddable description building routine 30 into a resultant MPEG-7 content description 32 that is afterward inserted by insertion routine 34 into the digital material object 36. Content information may be additionally, or alternatively, received in various other formats requiring manipulation by a conversion routine 42. The provided information 44, which is not compliant with MPEG-7, passes through a converter routine 46 which interprets the content, often utilizing mapping information which associates the format of the received content to MPEG-7 format, whereupon a conversion is performed and the resultant MPEG-7 information is used singly, or in combination with, other information by the embeddable description building routine 30 to create the MPEG-7 content description 32 which is inserted by insertion routine 34 into header 38 of digital material object 36. The resultant digital material object, augmented with content information, is ready to be utilized within searches and is shown being deposited back to a repository 12 that may comprise remote or local databases 14 and internet resources 16. Although, the augmented content is shown being returned to the same repository 12, the augmented content may alternatively be deposited to other repositories or through various communication media.

It is anticipated that content providers, utilizing the system to augment existing content with MPEG-7 content descriptions, would typically perform off-line conversion processes on the database in-toto, thereby reducing issues relating to mixed versions and maintenance. The entire content repository would thereby be converted to add the new content information prior to the database being brought up, or restored, to active on-line status. It will be appreciated, however, that the system may be alternatively utilized by various entities for a number of applications which facilitate content searches and management.

FIG. 2 illustrates the general process of embedding the MPEG-7 content information within a digital material object. The process starts at block 50 and information is obtained at block 52 about the content laden object. The aforementioned methods of receiving, converting, and characterizing may be utilized in combination or separately to build content information to the desired degree of comprehensiveness. It will be appreciated that information from a number of sources can be agglomerated in the building of content information. Any information which was received but is not MPEG-7 compliant is converted at block 54 to MPEG-7 format. The content object is then modified starting at block 56 with the insertion of opening delimiters including META tag name, after which the MPEG-7 content description is inserted at block 58, followed by embedding of the closing delimiter 60. It will be appreciated that the description preferably comprises a series of layers commensurate with the object or objects being described within the MPEG-7 content description. The new augmented object is then stored as per block 62 as a target for subsequent enhanced searching, whereupon the process is completed at block 64.

FIG. 3 is a listing of a portion of an HTML header containing META tags and exemplifying the insertion point of the MPEG-7 content descriptions within the header information of the digital material object. It will be appreciated that the META names may be altered, and the structure modified without departing from the present invention. A "META NAME" for the embedded content description was selected as "MPEG7Unit" which is followed by the MPEG-7 content description. Portions of additional header elements are exemplified by the META tag "Robot", while the termination of the header is shown by the transition from a "</HEAD>" to a "<BODY>" which contains the web page. It will be appreciated that the MPEG-7 content descriptions may be inserted as a META tag within various document formats which contain headers. By way of example these formats include machine-to-man browser entities, such as the aforementioned web page, and machine-to-machine transaction sessions that are established through the use of a headered entity. In either exemplified case, the META tag MPEG-7 content information may be utilized directly or through programmatic means to increase the speed and accuracy of searching content contained therein.

Accordingly, it will be seen that this invention provides a method and system for augmenting documents and other content containing digital material objects with content descriptions that can be utilized for increasing the speed and accuracy of content related searches. It will be appreciated that the method and system may be implemented using a variety of computer systems, and that the method is applicable to various forms of content-laden digital material objects containing headers. Specific instances of embedded MPEG-7 content descriptions have been described by way of example, and it should be realized that the specific syntax and use of delimiters can be widely varied without departing from the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer implemented system for augmenting a digital material object with an MPEG-7 content description to enhance the speed and accuracy of content searching thereof, comprising:
    means for obtaining content descriptions in accord with MPEG-7 standards for elements of content associated with the digital material object;
    an embeddable description building routine that is configured for adding META tag structures to the MPEG-7 content descriptions obtained by said means to create an embeddable META tap structure; and
    an insertion routine configured for inserting said embeddable META tag structure into the header of said digital material object.

2. A system as recited in claim 1, wherein said means for obtaining said MPEG-7 content descriptions comprises:
    an interface routine capable of receiving MPEG7 content descriptions associated with the elements of said content associated with said digital material object.

3. A system as recited in claim 1, wherein said means for obtaining MPEG-7 content descriptions comprises:
    a characterization routine for determining characteristics of content elements which may be represented within an MPEG-7 content description.

4. A system as recited in claim 1, wherein said means for obtaining MPEG-7 content descriptions comprises:
    a conversion routine capable of converting content information from a format that is not compliant with MPEG-7 into a compliant format.

5. A system as recited in claim 1, wherein said means for obtaining MPEG-7 content descriptions comprises:
    a human interface capable of collecting content information from a human interacting with the system.

6. A system as recited in claim 1:
    wherein said description embedded within said embeddable META tag structure is written in a markup language.

7. A system as recited in claim 6:
    wherein said markup language comprises an SGML-based markup language.

8. A system as recited in claim 7:
    wherein said SGML-based markup language is selected from the group of SGML subsets consisting of HTML, XML, and WAP.

9. A computer implemented system for augmenting a digital material object with an MPEG-7 content description to facilitate content searching, comprising:
    a content description definition routine configured for associating an MPEG-7 content description with a given digital material object;
    an embeddable description building routine configured for adding META tag structures to the MPEG-7 content descriptions obtained through said content description definition routine and configured for being embedded within the digital material object; and an insertion routine configured for inserting the embeddable META tag structure into the header of said digital material object.

10. A system as recited in claim 9, wherein said content description definition routine comprises:
an interface routine capable of receiving MPEG-7 content descriptions associated with the elements of content within said digital material object.

11. A system as recited in claim 9, wherein said content description definition routine comprises:
a characterization routine for determining characteristics of content elements within said digital material object which may be represented within an MPEG-7 content description.

12. A system as recited in claim 9, wherein said content description definition routine comprises:
a conversion routine adapted for converting content information from a format that is not compliant with MPEG-7 into a compliant MPEG-7 format.

13. A system as recited in claim 9, wherein said content description definition routine comprises:
a human interface capable of collecting content information from a human interacting with the system.

14. A system as recited in claim 9, wherein said embeddable META tag structure comprises:
an MPEG-7 opening META tag delimiter within said header of said digital material whose content is to be described followed by a closing META tag delimiter.

15. A system as recited in claim 14:
wherein said header is written in a markup language.

16. A system as recited in claim 15, wherein said markup language comprises:
an SGML-based markup language.

17. A system as recited in claim 16:
wherein said SGML-based markup language is selected from the group of SGML subsets consisting essentially of HTML, XML, and WAP.

18. A computer implemented method of augmenting digital material with content description information to enhance the selection of digital material during searches, comprising:
embedding an MPEG-7 opening META tag delimiter within the header of digital material whose content is to be described;
inserting at least one content description according to the MPEG-7 multimedia content description standard to describe elements of said content contained within said digital material into which said content description information is being embedded to allow parameterized content-related searches; and
embedding an MPEG-7 closing META tag delimiter within said header to signify the end of said MPEG-7 related content descriptions.

19. A method as recited in claim 18, wherein said content descriptions comprise:
descriptors and descriptor schemes utilized separately or in combination.

20. A method as recited in claim 19:
wherein said header is written in a markup language.

21. A method as recited in claim 20, wherein said markup language comprises:
an SGML-based markup language.

22. A method as recited in claim 21, wherein said SGML-based markup language is selected from the group of SGML subsets consisting of HTML, XML, and WAP.

23. A method as recited in claim 18, wherein said digital material comprises:
a web site written in a markup language that may contain elements of multimedia content.

24. A method as recited in claim 18, further comprising:
creating MPEG-7 content descriptions from characterization of said content relating to an associated content file.

25. A method as recited in claim 18, further comprising:
creating MPEG-7 content descriptions that are converted from alternative description formats.

26. A method as recited in claim 18, further comprising:
creating MPEG-7 content descriptions which are derived from human intervention.

27. A method as recited in claim 26, wherein said human intervention comprises:
the entry of objective and subjective characterization data about said content as entered by said human intervention.

* * * * *